United States Patent [19]

Kishi et al.

[11] Patent Number: 4,639,172

[45] Date of Patent: Jan. 27, 1987

[54] TRACE CONTROL METHOD

[75] Inventors: Hajimu Kishi; Mitsuo Matsui; Hitoshi Matsuura, all of Tokyo, Japan

[73] Assignee: Fanuc Ltd., Yamanashi, Japan

[21] Appl. No.: 700,703

[22] PCT Filed: Feb. 20, 1984

[86] PCT No.: PCT/JP84/00056

§ 371 Date: Jan. 25, 1985

§ 102(e) Date: Jan. 25, 1985

[87] PCT Pub. No.: WO84/04718

PCT Pub. Date: Dec. 6, 1984

[30] Foreign Application Priority Data

May 31, 1983 [JP] Japan ................ 58-096289

[51] Int. Cl.⁴ .................. B23Q 35/121; G05B 19/24
[52] U.S. Cl. ...................... 409/80; 318/570; 364/474; 409/99
[58] Field of Search .............. 409/98, 99, 127, 80; 318/570, 574; 364/474

[56] References Cited

U.S. PATENT DOCUMENTS

| | | | |
|---|---|---|---|
| 3,749,995 | 7/1973 | Leehouts | 318/570 |
| 3,786,331 | 1/1974 | Sommeria et al. | 318/570 |
| 3,904,944 | 9/1975 | Carrick et al. | 409/80 |
| 4,355,362 | 10/1982 | Imazeki et al. | 409/99 X |
| 4,456,962 | 6/1984 | Imazeki et al. | 364/474 |

FOREIGN PATENT DOCUMENTS

| | | | |
|---|---|---|---|
| 34006 | 8/1981 | European Pat. Off. | 409/99 |
| 2412246 | 3/1975 | Fed. Rep. of Germany | 318/570 |

*Primary Examiner*—William R. Briggs
*Attorney, Agent, or Firm*—Staas & Halsey

[57] ABSTRACT

Provided is a tracer control method in a master-slave type tracer system having first and second tracer units in each of which a tracer controller ($TCC_1$, $TCC_2$) generates velocity commands ($V_x$, $V_y$, $V_z$) along respective axes by using a detection signal generated by a tracer head ($TC_1$, $TC_2$), motors ($XM_1$, $YM_1$, $ZM_1$; $XM_2$, $YM_2$, $ZM_2$) provided for respective axes are driven on the basis of the velocity commands and a workpiece ($WK_1$, $WK_2$) is subjected to tracer machining conforming to the profile of a model (MDL), tracer machining being performed by tracing a model ($MDL_1$) with the tracer head ($TC_1$) on the first tracer unit side and providing the second tracer unit with a move command on the basis of the tracing. In the tracer control method, the first tracer unit ($TCC_1$, $TCM_1$) produces the velocity commands ($V_x$, $V_y$, $V_z$) in digital form to drive the motors ($XM_1$, $YM_1$, $ZM_1$) for the respective axes, monitors a current position of a movable element, and sends a distance travelled along each axis during a predetermined time interval as a digital move command to the second tracer unit ($TCC_2$, $TCM_2$). A pulse distributor ($PDC_2$) of the second tracer unit performs a pulse distribution calculation on the basis of move command data received as an input from the first tracer unit, thereby to control the motors ($XM_2$, $YM_2$, $ZM_2$) of the respective axes on the side of the second tracer unit.

12 Claims, 4 Drawing Figures

TRACE CONTROL METHOD

BACKGROUND OF THE INVENTION

This invention relates to a tracer control method and, more particularly, to a tracer control method in a master-slave type tracer system provided with two tracer units, wherein a tracer head is made to trace a model on a first tracer unit side, the first tracer unit generates a move command for a second tracer unit side on the basis of the aforementioned tracing, and machining is performed on the second tracer unit side on the basis of the move command.

A master-slave type tracer system has at least two tracer units. A model is traced on the first tracer unit side (master side), the first tracer unit generates a move command for a second tracer unit side (slave side) on the basis of the aforementioned tracing, and machining is performed on the slave side on the basis of the move command. The individual tracer units constituting such a master-slave type tracer system operate by causing a tracer head to trace a model, calculating velocity commands along various axes by means of a tracer control circuit using a deflection quantity sensed by the tracer head, driving motors for the corresponding axes on the basis of the analog velocity commands to transport a tool relative to a workpiece, and repeating these operations to machine the workpiece into a shape identical with that of the model. To carry out master-slave tracer control, the arrangement is such that an analog velocity command voltage produced as an output by the tracer control circuit of one tracer unit (master side) is applied to a velocity control unit of the other tracer unit (slave side) through an analog gate.

Thus, in the conventional master-slave system, a velocity command is produced in the form of an analog value, and the move command transmitted from the master side to the slave side also is an analog value. Consequently, the system is susceptible to disturbance such as supply voltage fluctuation or noise, so that accurate commands cannot be generated. The disadvantageous result is that highly precise tracer machining cannot be performed.

Further, since the move command sent from the master side to the slave side is applied as an analog velocity command in the above-described master-slave system, a drawback is that the machined profile cannot be enlarged or reduced in size with respect to the model profile.

SUMMARY OF THE INVENTION

An object of the present invention is to provide a tracer control method in a master-slave type tracer system, whereby digital velocity commands can be generated and, moreover, move commands sent from the master side to the slave side can be made digital quantities.

Another object of the present invention is to provide a tracer control method whereby a move command sent from the master side to the slave side can be applied in the form of a digital travelling distance rather than in the form of velocity.

Still another object of the present invention is to provide a tracer control method whereby the size of a workpiece machined on the slave side can be enlarged or reduced with respect to the size of a model.

A further object of the present invention is to provide a tracer control method whereby the size of a workpiece machined on the slave side can be enlarged or reduced at different scale factors along the various axes.

The present invention provides a tracer control method having first and second tracer units in each of which a tracer controller generates velocity commands along respective axes by using a detection signal generated by a tracer head in one of the units, motors provided for respective axes are driven on the basis of the velocity commands and a workpiece is subjected to tracer machining conforming to the profile of a model, wherein the tracer machining is performed by tracing the model with a tracer head in for instance the first tracer unit side (master side) and the second tracer unit (slave side) is provided with a move command on the basis of the aforementioned tracing. The tracer control method includes producing the velocity commands in digital form to drive the motors for the respective axes on the slave side, monitoring a current position of a movable element on the master side, sending at a predetermined time interval the current position, or a distance travelled during the predetermined time interval, as a digital move command to the tracer unit on the slave side, and performing tracer machining on the slave side on the basis of the move command. Further, the present invention provides a tracer control method which includes entering in advance a scale factor S with respect to the model of a workpiece, monitoring relative travelling distances of the master-side tracer head with respect to a model along each of various axes, sending a travelling distance d for each axis, which prevails at a predetermined time interval, or a value obtained by multiplying this travelling distance by the scale factor, to the tracer unit on the slave side for each and every axis in the form of a digital move command along each axis, generating, in the tracer unit on the slave side, pulses of a number corresponding to S.d, and moving a tool on the slave side relative to the workpiece along each of the abovementioned axes in response to the pulses, thereby to machine the workpiece into one having a size which is S times that of the model.

DESCRIPTION OF PREFERRED EMBODIMENTS

Figure 1:
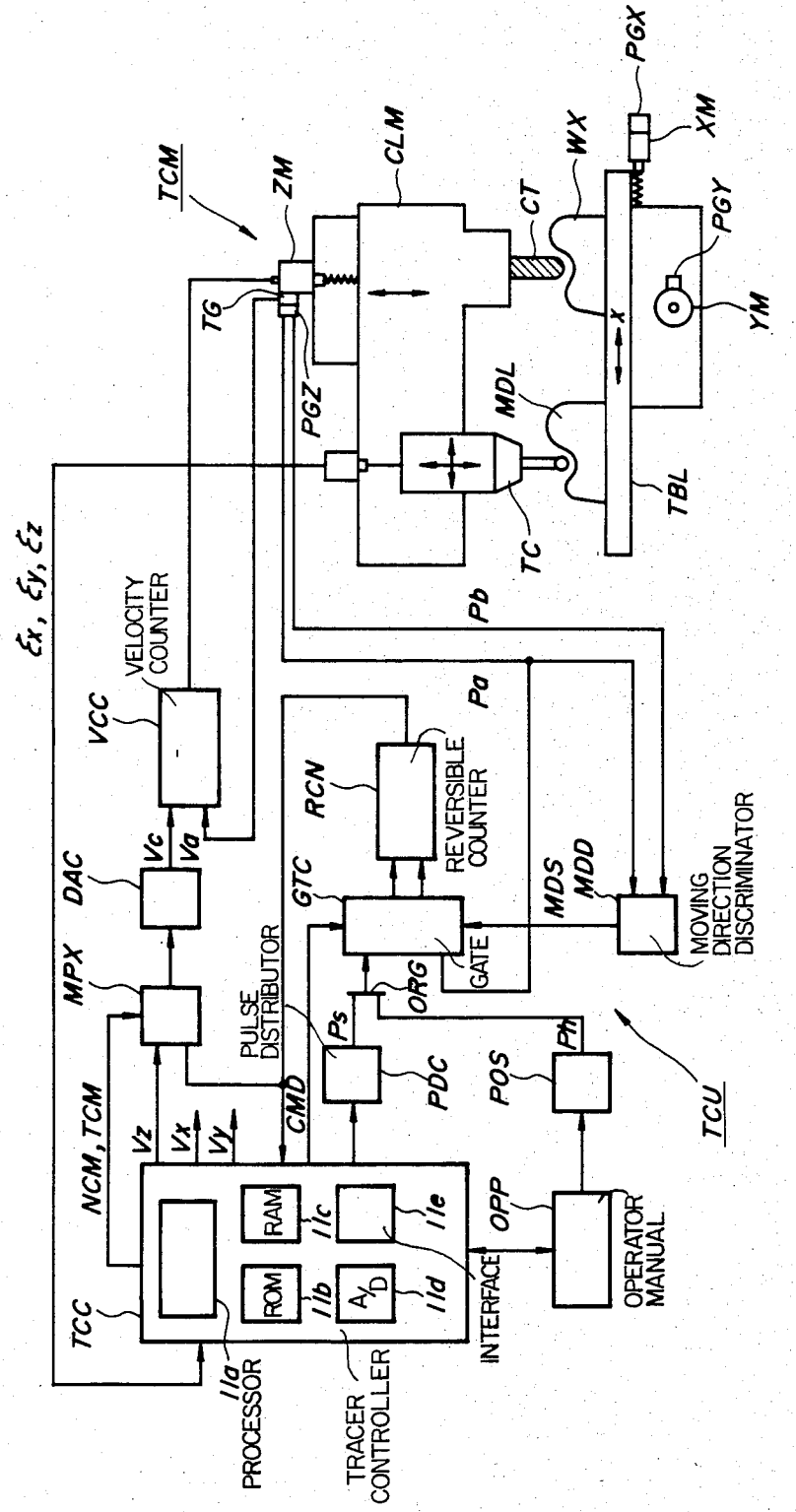
FIG. 1 is a view for describing a tracer unit which is capable of being applied to the tracer control method of the present invention.

FIG. 1 is a block diagram of a tracer unit capable of being applied to a master-slave type tracer control method according to the present invention. Only the control loop for the Z axis is shown. A tracer machine tool side TCM is provided with an X-axis motor XM for driving a table TBL along the X axis, a Z-axis motor ZM for driving, along the Z axis, a column CLM mounting a tracer head TC and a cutter head CT, and a Y-axis motor YM for moving the table TBL along the Y axis. Secured to the table TBL are a model MDL and a workpiece WK. The tracer head TC contacts and traces the surface of the model MDL, and the cutter head CT cuts the workpiece WK in accordance with the shape of the model. As known in the art, the tracer head TC is arranged to sense deflections $\epsilon_x$, $\epsilon_y$, $\epsilon_z$ along the respective X, Y and Z axes of the surface of model MDL, and the deflections along the various axes sensed by the tracer head TC is applied to a tracer controller TCC of microcomputer construction for performing known tracing calculations to generate digital velocity commands $V_x$, $V_y$, $V_z$ along the respective axes. The tracer controller TCC includes a processor 11a, a ROM 11b for storing a control program, a RAM 11c for storing the results of processing and current positions $X_a$, $Y_a$, $Z_a$ along the respective axes, an AD converter 11d for converting each of the axial deflections $\epsilon_x$, $\epsilon_y$, $\epsilon_z$ from the tracer head TC into digital values, and an interface circuit 11e for administering an exchange of data with another tracer controller. The interface circuit 11e has a well-known construction and includes, e.g., a buffer memory for temporarily storing data to be transmitted to the other tracer controller, a driver for transmitting the data, a receiver for receiving data transmitted by the other tracer controller, a buffer memory for storing these data, and a control unit for controlling data transmission and reception.

Let us consider surface tracing in the X-Z plane. When the tracer head TC contacts the model MDL due to an approach operation, the tracer head generates the axial deflections $\epsilon_x$, $\epsilon_y$, $\epsilon_z$ and the tracer controller TCC generates the digital velocity commands $V_x$, $V_z$. Of these velocity commands, $V_z$ is applied to a digital-analog converter (referred to as a DA converter) DAC through a multiplexer MPX and is thus converted into an analog velocity command voltage Vc which is applied to a velocity control unit VCC. It should be noted that two modes, namely a tracer mode and numerical control mode (referred to as an NC mode), are available as control modes. At the time of tracer control, a tracer mode signal TCM is generated so that the multiplexer MPX passes only $V_z$. The velocity control unit VCC drives the Z-axis motor ZM on the basis of a difference between an actual velocity voltage $V_a$ generated by a tachogenerator TG, and the velocity command voltage $V_c$. At the same time, the X-axis motor XM is driven in like fashion. Thus, the cutter head CT is transported relative to the workpiece WK to machine the workpiece in accordance with the model profile, and the tracer head TC traces the surface of the model MDL. Thereafter, the tracer head TC generates the deflection quantities $\epsilon_x$, $\epsilon_y$, $\epsilon_z$ in accordance with the model profile, and applies these deflection quantities to the tracer controller TCC. The deflection quantities $\epsilon_x$, $\epsilon_y$, $\epsilon_z$ are read by the processor 11a following their conversion into digital values by the AD converter 11d.

The processor 11a calculates a resultant deflection quantity $\epsilon$ based on the following equation:

$$\epsilon = \sqrt{\epsilon_x^2 + \epsilon_y^2 + \epsilon_z^2} \tag{1}$$

and calculates a difference $\Delta\epsilon(=\epsilon-\epsilon_o)$ between the resultant deflection quantity $\epsilon$ and a reference deflection quantity $\epsilon_o$ preset by an operator's panel OPP.

The processor 11a generates a velocity signal $V_N$ which varies in proportion to the difference $\Delta\epsilon$, and a velocity signal $V_T$ which varies in inverse proportion to $\Delta\epsilon$. However, when $\Delta\epsilon=0$ holds, $V_N$ is zero and $V_T$ is a tracer velocity F preset by the operator's panel OPP.

The processor 11a uses the deflection signals $\epsilon_x$, $\epsilon_z$ along the X and Z axes to calculate deflection direction signals $\sin \theta$, $\cos \theta$ by performing the operations given by the following equations:

$$\sin\theta = \epsilon_x / \sqrt{\epsilon_x^2 + \epsilon_z^2} \tag{2}$$

$$\cos\theta = \epsilon_z / \sqrt{\epsilon_x^2 + \epsilon_z^2} \tag{3}$$

and calculates velocity signals $V_a$, $V_b$ along the respective axes by performing the operations given by the following equations:

$$V_a = V_T \sin\theta + V_N \cos\theta \tag{4}$$

$$V_b = -V_T \cos\theta + V_N \sin\theta \tag{5}$$

When $V_a$, $V_b$ have been obtained from Eqs. (4), (5), the processor 11a establishes the conditions $V_x=V_a$, $V_z=V_b$, since surface tracing takes place in the X-Z plane, and delivers these to the multiplexer MPX. Thereafter, the X- and Z-axis motors are driven by newly calculated digital velocity commands $V_x$, $V_z$, the tracer head TC is transported along the model surface, and the cutter head CT undergoes identical movement to machine the workpiece WK to a profile identical with that of the model MDL. When the tracer head arrives at a boundary point along the X axis, the processor 11a regards the Y-Z plane as the tracing plane, produces velocity signals $V_a$, $V_b$, calculated according to Eqs. (4), (5), as $V_y$, $V_z$ ($V_y=V_a$, $V_z=V_b$), and executes pick-feed processing. When the travelling distance along the Y axis becomes equal to a pick-feed quantity P preset by the operator's panel OPP, the tracing plane is again taken as the X-Z plane and the above-described tracer control processing is performed.

Monitoring control of the current position along each axis is performed in concurrence with the foregoing tracer control. For example, when the Z-axis motor ZM rotates through a predetermined angle, a position sensor PGZ (such as a pulse coder or position coder) generates a set of feedback pulses $P_a$, $P_b$, which are displaced in phase from each other by 90°. The feedback pulses $P_a$, $P_b$ are applied to a moving direction discriminating circuit MDD where the direction of movement is discriminated. Specifically, direction of movement can be discriminated based on whether the phase of the pulses $P_a$ leads the phase of the pulses $P_b$. Accordingly, the moving direction discriminating circuit MDD delivers a movement direction signal MDS to a gate circuit GTC in dependence upon whether there is a leading or lagging phase relationship. Where the Z-axis motor ZM is rotating in the forward direction, the gate circuit GTC applies the feedback pulses $P_a$ to a subtraction terminal of a reversible counter RCN, and applies distributed pulses $P_s$, described below, to an addition terminal of the counter. If the Z-axis motor ZM is rotating in the reverse direction, the feedback pulses $P_a$ are applied to the addition terminal and the distributed pulses $P_s$ to the subtraction terminal. The following discussion will relate to a current position monitoring method (referred to as "follow-up") in a case where the Z-axis motor is rotating in the forward direction.

With the generation of a number m, feedback pulses $P_a$, assume that the status (the initial value whereof is zero) of the reversible counter RCN takes on a value of $-m_1$. The status of the reversive counter RCN is read at a predetermined period by the processor 11a of the tracer controller TCC. The processor 11a updates the current position $Z_a$ along the Z axis, which position is stored in the RAM 11c, in accordance with the following expression:

$$Z_a + m_1 \to Z_a \qquad (6)$$

and applies $m_1$ to a pulse distributor PDC. When $m_1$ is commanded, the pulse distributor PDC immediately performs a pulse distribution calculation to produce a number $m_1$ of distributed pulses $P_s$. The distributed pulses $P_s$ enter the addition terminal of the reversible counter RCN via an OR gate ORG and the gate circuit GTC, whereby the status of the counter is updated step by step in the positive direction. Accordingly, when the motor ZM stops after $m_1$ pulses are generated, the value of the count in the reversible counter RCN becomes zero owing to the $m_1$ pulses generated by the pulse distributor PDC. However, when the Z-axis motor is rotating, the feedback pulses $P_a$ enter the subtraction terminal of the reversible counter as before in concurrence with the aforementioned pulse distribution calculation, so that the status of the counter is updated step by step in the negative direction without becoming zero, even when the pulse distributor generates $m_1$ of the distributed pulses. Therefore, letting $t_1$ represent the time at which the status $-m_1$ is read out of the reversible counter RCN, $t_2$ the time at which $m_1$ of the distributed pulses $P_s$ are generated, and $m_2$ the number of feedback pulses $P_a$ generated between times $t_1$ and $t_2$, the status of the reversible counter RCN at time $t_2$ will be $-m_2$.

Upon generation of a number of distributed pulses equivalent to $m_1$ (i.e., when a sampling pulse of a predetermined period has been generated), the processor 11a of the tracer controller TCC again reads the status ($-m_2$) of the reversible counter RCN, updates the current position along the Z axis by performing the following addition operation:

$$Z_a + m_2 \to Z_a \qquad (7)$$

and commands the pulse distributor PDC to output $m_2$ pulses. Thereafter, whenever the sampling pulse is generated, the processor 11a reads the status $-m_i$ ($i=1, 2, 3$) of the reversible counter RCN, performs the following addition operation:

$$Z_a + m_i \to Z_a \qquad (8)$$

and applies the numerical value $m_i$ to the pulse distributor PDC. The current position $Z_a$ along the Z-axis is constantly updated in real time by subsequently repeating the foregoing operations. It should be noted that while the foregoing has been described with regard to the current position $Z_a$ along the Z axis, updating can be performed in similar fashion for current positions $X_a$, $Y_a$ along the X and Y axes using pulses generated by position sensors PGX, PGY.

The unit illustrated in FIG. 1 is capable of performing path control in the manner of an ordinary numerical control unit (NC unit) when an NC mode is established. As an example, when the tracer controller TCC applies a travelling distance $\Delta Z$ to the pulse distributor PDC, a commanded moving direction signal CMD to the gate circuit GTC and an NC mode signal NCM to the multiplexer MPX, the pulse distributor PDC generates the distributed pulses $P_s$, which enter the gate circuit GTC through the OR gate ORG. The gate circuit GTC applies the distributed pulses $P_s$ to the addition terminal of the reversible counter RCN if the commanded direction is positive, and to the subtraction input terminal of the counter if the commanded direction is negative. Let us assume that the commanded direction is positive. In such case, the distributed pulses $P_s$ are counted up by the reversible counter RCN, and the counted value thereof is applied, via the multiplexer MPX, to the DA converter DAC where the counted value is converted into the analog command velocity voltage $V_c$ and then applied to the velocity control unit VCC. The latter drives the Z-axis motor ZM on the basis of the difference between the actual velocity voltage $V_a$ and the velocity command voltage $V_c$, so that the column CLM is transported along the Z axis. When the Z-axis ZM rotates, the feedback pulses $P_a$, $P_b$ are generated so that the value of the count in the reversible counter RCN is reduced toward zero. When the counted value in the reversible counter RCN gradually increases and becomes substantially constant, a steady condition is attained, as a result of which the Z-axis motor ZM rotates at a constant velocity and the distributed pulses cease being produced, the counted value gradually decreases and the Z-axis motor decelerates, rotates the commanded amount and stops. In a case where the tracer machine tool is desired to be moved manually, the first step is to select the manual mode using the operator's panel OPP. In response, the tracer controller TCC delivers the NC mode signal NCM to the multiplexer MPX. Thereafter, a manual feed switch or manual pulse generator provided on the operator's panel is operated, whereupon the tracer controller TCC delivers the commanded moving direction signal CMD to the gate circuit GTC, in dependence upon the manual feed direction. In addition, a pulse generator POS generates pulses $P_h$. Thereafter, the tracer machine tool is transported in the same fashion as the foregoing case, which was based on the distributed pulses $P_s$.

Figure 2:
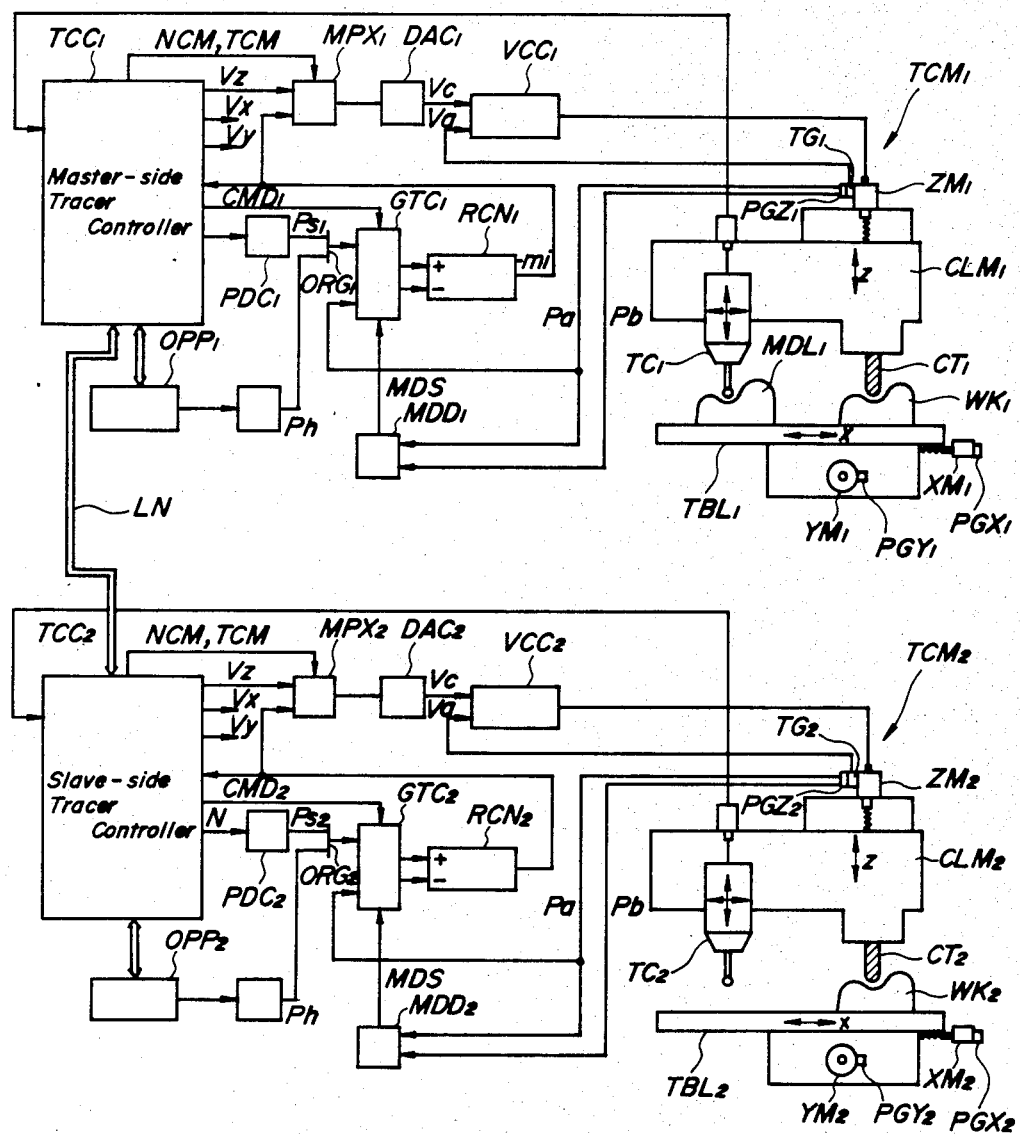
FIG. 2 is a view showing the construction of a master-slave type tracer system for realizing the tracer control method of the present invention.
Figure 3A:
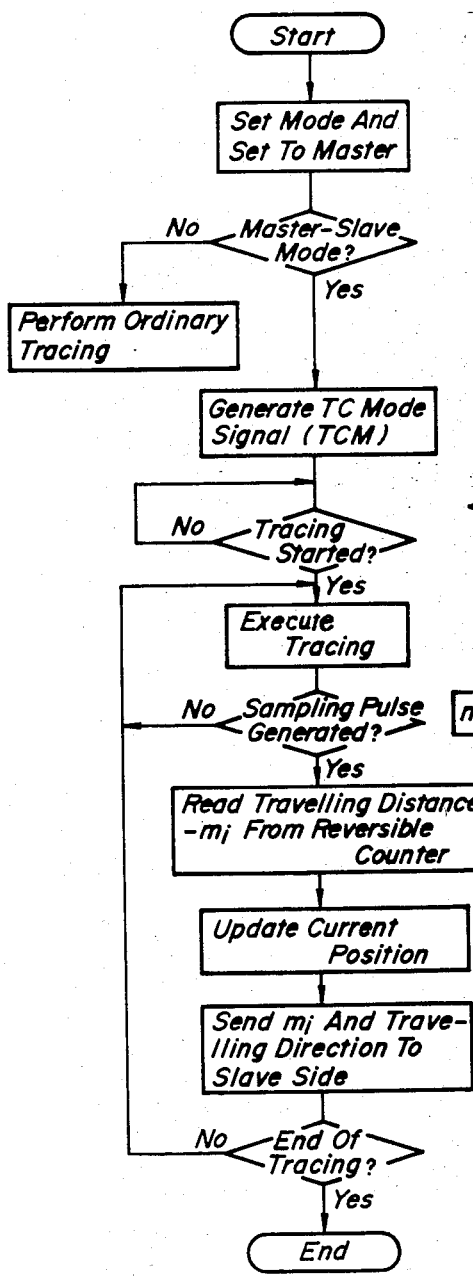
FIGS. 3A and 3B are a flowchart of processing indicative of the method of the present invention.
Figure 3B:
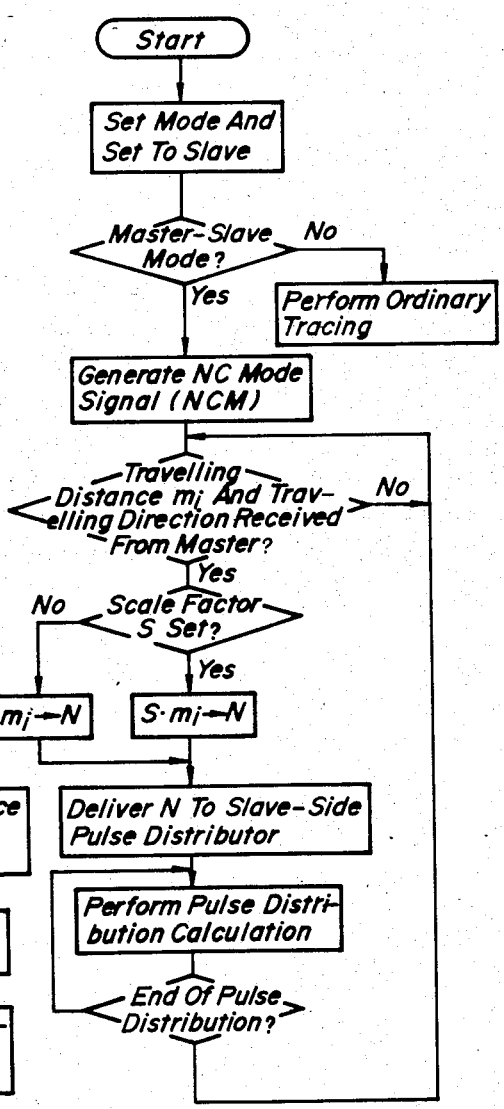

FIG. 2 is a block diagram of a master-slave type tracer system according to the present invention. FIG. 3(A) is a flowchart of processing on the master side, and FIG. 3(B) is a flowchart of processing on the slave side. Portions in FIG. 2 similar to those shown in FIG. 1 are designated by like alphabetic characters, with those on the master side being indicated by the suffix 1 and those on the slave side by the suffix 2. A tracer controller TCC$_1$ on the master side and a tracer controller TCC$_2$ on the slave side are interconnected by the interface circuit 11e (see Fig. 1) and a line LN.

Master-slave tracer control will now be described.

Mode selection switches on operator's panels OPP$_1$, OPP$_2$ are placed in a master-slave mode and the distinction between the master and slave is entered. The tracer controller TCC$_1$ on the tracer unit side designated as the master (i.e., the master side) delivers the tracer mode (TC mode) signal TCM to a multiplexer MPX$_1$, and the tracer controller TCC$_2$ on the tracer unit side designated as the slave (i.e., the slave side) delivers the NC mode signal NCM to a multiplexer MPX$_2$.

When tracing is started under these conditions, the tracer unit on the master side executes the above-described tracer operation in accordance with the flowchart shown in FIG. 3(A), and the current position along each axis is monitored by follow-up control.

In follow-up control, the tracer controller TCC$_1$ reads the numerical value $-m_i$ out of a reversible counter RCN$_1$ at a predetermined period T (i.e., whenever a sampling pulse is generated). It should be noted that the counted value $m_i$ is equivalent to the distance travelled by the tracer machine tool along the Z axis during the period T. The processor 11a of the tracer controller $TCC_1$ on the master side updates the current position $Z_a$ along the Z axis in accordance with expression (8) by using the counted value (travelling distance) $m_i$, and delivers the digital travelling distance and the direction of movement, which serve as a move command for the slave side, to the slave-side tracer controller $TCC_2$ via the interface circuit 11e and line LN.

When the move command arrives from the master side, the processor 11a of the tracer controller $TCC_2$ on the slave side checks whether a scale factor S has been set. If it has, the processor performs the following operation:

$$S \cdot m_i \rightarrow N$$

using S and the travelling distance data $m_i$. If the scale factor S has not been set, or if S=1 holds, then the processor performs the following operation:

$$m_i \rightarrow N$$

and applies N to a pulse distributor $PDC_2$ on the slave side. It should be noted that the scale factor S is entered in advance using an operator's panel $OPP_2$ and is stored in the RAM 11c of the tracer controller $TCC_2$. In addition, the tracer controller $TCC_2$ delivers the moving direction signal $CMD_2$ to a gate circuit $GTC_2$.

The pulse distributor $PDC_2$ executes a pulse distribution calculation on the basis of the travelling distance N and generates N-number of distributed pulses $Ps_2$. The distributed pulses $Ps_2$ are applied to a reversible counter $RCN_2$ via an OR gate $ORG_2$ and gate circuit $GTC_2$. Thereafter, in exactly the same fashion as in the positioning control operation described above, the tracer machine tool on the slave side is moved to machine a workpiece $WK_2$ to a size which is S times that of a model $MDL_1$ or to a size which is the same as that of the model.

The foregoing is for a case where a model is traced on the master side. It should be noted, however, that it is also possible to trace a model on the slave side. Further, a case has been described in which the master-side travelling distance $m_i$ which prevails at a predetermined period is delivered as move command data from the master side to the slave side. However, an arrangement is possible wherein a master-side current position $Z_{an}$ which prevails at a period T is delivered to the slave side as move command data, the following operations are performed on the slave side:

$$Z_{an} - Z_{ao} \rightarrow m_i$$

$$S \cdot m_i \rightarrow N$$

and N is delivered to the pulse distributor $PDC_2$. It should be noted that $Z_{ao}$ is a current position along the Z axis one period earlier. In addition, an arrangement is possible wherein the calculation $S \cdot m_i \rightarrow N$ is performed on the master side and N is delivered to the slave side.

Further, it may be arranged so that a scale factor can be set for each controlled axis. Then, letting travelling distances along the X, Y and Z axes every T seconds be $x_i$, $y_i$ and $z_i$, respectively, incremental quantities $X_i$, $Y_i$, $Z_i$ obtained through the following calculations can be applied, as slave-side travelling distances along the respective axes, to the pulse distributors of the respective axes:

$$X_i = s_x \cdot x_i$$

$$Y_i = s_y \cdot y_i$$

$$Z_i = s_z \cdot y_i$$

where $s_x$, $x_y$, $s_z$ are scale factors along the respective axes.

According to the present invention as described above, in a master-slave type system, a velocity command is produced in digital form to control the position of a movable element on the master side, the position of the movable element along each axis on the master side is monitored, and a current position of the movable element prevailing at a predetermined interval, or a distance travelled during the predetermined time interval, is sent to the slave side as a digital move command along each axis of the slave side. Accordingly, the effects of external disturbance such as supply voltage fluctuation or noise are eliminated, thereby making it possible to carry out highly precise tracer machining. In addition, the slave side performs a positioning operation in which the values are decided, so that stringent control of the kind associated with voltage commands is unnecessary.

Further, according to the present invention, in a master-slave tracer system, it is arranged to enter a scale factor S with respect to the model of a workpiece, monitor travelling distances of the master-side tracer head relative to a model along each axis, send travelling distances dx, dy, dz for the respective axes, which travelling distances prevail at a predetermined time interval, or values S·dx, S·dy, S·dz obtained by multiplying these travelling distances by the scale factor, to the tracer unit on the slave side in the form of a digital move command along each axis, generate, in the tracer unit on the slave side, pulses the numbers of which correspond to S·dx, S·dy, S·dz, and move a tool on the slave side relative to the workpiece along each axis in response to the pulses. This makes it possible to readily enlarge or reduce the size of the workpiece with respect to the size of the model.

The present invention is useful for application to a master-slave type tracer system.

We claim:

1. A method for operating a master-slave type tracer system, comprising
   machining a workpiece according to a model by tracing said model with a master unit of said system, said master unit including a tracer head for tracing a model and cutting means for cutting said workpiece, wherein said tracer means and cutting means are moved together on a movable element by respective motors of said master unit along respective axes for said tracing and machining, and said master unit calculates velocity commands in digital form to drive said respective motors along said respective axes of said master unit, to provide said machining according to displacement signals corresponding to said respective axes from said tracing of said model by said tracer head, and
   simultaneously machining a further workpiece, with a slave unit of said system which includes a respective cutter means driven along respective axes by respective motors of said slave unit, for machining said further workpiece in correspondence to said tracing by said master unit of said model according to a move command supplied from said master unit, for each of said respective axes of said slave unit in correspondance to said axes of said master unit during each of a succassion of intervals, wherein each said move command is provided from said master unit to said unit as digital numerical data, as a result of said master unit monitoring data corresponding to the current position along each respective axis of the movable element thereof on which said tracer head is mounted, and said slave unit calculates, on the basis of each said mode command from said master unit, a respective number of pulses corresponding to the movement to be provided along each respective axis of said slave unit during each said period, and produces each said number of calculated pulses during each respective period, wherein said machining by said slave unit is provided by movement of the respective cutter means along each respective axis of said slave unit according to the pulses for each said axis for each said period.

2. The method of claim 1, wherein each said move command is proportional to a respective current position along each respective one of said axes of said master unit.

3. The method of claim 1, wherein each said move command is proportional to a distance that is moved along a respective one of said axes of said slave unit for machining the further workpiece.

4. The method of claim 2 or 3, comprising selecting a respective proportional factor between said move commands, for each said axis of said master unit, and the corresponding distances to be moved in said slave unit along the respective axes thereof.

5. The method of claim 2 or 3, comprising selecting a respective proportional factor between each said axis of said master unit and the respective digital numerical data of each said move command supplied from said master unit.

6. The method of claim 4, said slave unit including a respective tracer head for tracing a respective model of said slave unit, and a respective movable element for moving in common said tracer head and said cutter means of said slave unit, said method
comprising interchanging the respective recited functions for said master unit so that said slave unit traces said respective model while machining the respective workpiece of said slave unit, and provides said move command as said digital numerical data to said master unit for providing said machining of the workpiece of said master unit in accordance with the move command from said slave unit.

7. The method of claim 5, said slave unit including a respective tracer head for tracing a respective model, and a respective movable element for moving in common said tracer head and said cutter means of said slave unit,
said method comprising interchanging the respective recited functions for said master so that said slave unit traces said respective model while machining the respective workpiece of said slave unit, while providing said move command as said digital numerical data to said master unit for providing said machining of the workpiece of said master unit in accordance with the move command from said slave unit.

8. The method of claim 4, wherein said slave unit calculates, on the basis of each said move command from said master unit, a respective number of pulses corresponding to the movement to be provided along each respective axis of said slave unit during each said period, and produces each said number of calculated pulses during each respective period, wherein said machining by said slave unit is provided by movement along each respective axis thereof of a movable element of said slave unit on which said cutter means of said slave unit is mounted, according to the pulses for each said axis of said slave unit for each said period.

9. The method of claim 5, wherein said slave unit calculates, on the basis of each said move command from said master unit, a respective number of pulses as corresponding to the movement to be provided along each respective axis of said slave unit during each said period, and produces each said number of calculated pulses during each respective period, wherein said machining by said slave unit provided by movement along each respective axis thereof of a movable element of said slave unit according to the pulses for each said axis thereof for each said period.

10. The method of claim 1, wherein each said move command is calculated by said master unit on the basis of follow-up control.

11. The method of claim 9, wherein each said move command is calculated by said master unit on the basis of follow-up control.

12. An apparatus for performing the method of any one of claims 1 to 3, wherein said slave unit comprises means for calculating a respective number of pulses from each respective move command for each axis thereof for each said period,
said movable element of said slave unit is moved along each said axis of said slave unit by said respective motors,
and means for controlling the motion of said movable element to provide said machining of said workpiece of said slave unit according to the respective numbers of calculated pulses for each said axis in each said interval.

* * * * *